(12) United States Patent
Drennen et al.

(10) Patent No.: US 6,401,879 B1
(45) Date of Patent: Jun. 11, 2002

(54) ELECTRIC PARK BRAKE ACTUATOR (ELECTRIC CALIPER)

(75) Inventors: David B. Drennen; Patrick A. Mescher, both of Bellbrook, OH (US); Pierre Claude Longuemare, Paris (FR); Harald Klode, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/798,239

(22) Filed: Mar. 2, 2001

(51) Int. Cl.[7] .............................. B60L 7/00; F16D 55/02
(52) U.S. Cl. ...................... 188/158; 188/72.1; 188/162; 188/72.8; 188/2 D; 188/216
(58) Field of Search ................................ 188/158, 162, 188/161, 72.1, 72.8, 72.7, 156, 163, 2 D, 106 D, 72.3, 216; 318/14; 303/3, 20, 115.2, 162; 60/545

(56) References Cited

U.S. PATENT DOCUMENTS

| | | | |
|---|---|---|---|
| 4,546,298 A | * 10/1985 | Wickham et al. | |
| 4,804,073 A | * 2/1989 | Taig et al. | 188/72.1 |
| 4,809,824 A | * 3/1989 | Fargier et al. | 188/72.8 |
| 4,895,227 A | * 1/1990 | Grenier et al. | |
| 4,921,076 A | * 5/1990 | Grenier et al. | 188/72.8 |
| 4,944,372 A | * 7/1990 | Taig | 188/156 |
| 5,090,518 A | * 2/1992 | Schenk et al. | 188/72.1 |
| 5,092,432 A | * 3/1992 | Taig | 188/72.3 |
| 5,769,189 A | * 6/1998 | Heibel et al. | 188/162 |
| 5,915,504 A | * 6/1999 | Döricht | 188/72.1 |
| 6,012,556 A | * 1/2000 | Blosch et al. | 188/162 |
| 6,040,665 A | * 3/2000 | Shirai et al. | 188/162 |
| 6,098,763 A | * 8/2000 | Holding | 188/158 |
| 6,142,265 A | * 11/2000 | Reimann et al. | 188/158 |
| 6,173,820 B1 | * 1/2001 | Blosch et al. | 188/158 |
| 6,179,097 B1 | * 1/2001 | Schumann | 188/162 |
| 6,189,661 B1 | * 2/2001 | Schaffer | 188/72.8 |
| 6,279,690 B1 | * 8/2001 | Schaffer | 188/71.9 |
| 6,279,691 B1 | * 8/2001 | Takahashi et al. | 188/72.8 |

* cited by examiner

*Primary Examiner*—Douglas C. Butler
(74) *Attorney, Agent, or Firm*—Scott A. McBain

(57) ABSTRACT

The electric park brake of the present invention includes an electric caliper motor assembly. The electric caliper motor assembly includes a motor, which is operably coupled to a shaft. The motor and shaft are surrounded by a housing. A friction wheel is disposed axially and operably connected to the shaft within the housing. A park brake motor is disposed within a second housing. The second housing is connected to the first housing and positioned laterally in relation to the shaft. An acme screw is operably coupled to the park brake motor wherein the acme screw interacts with an acme nut. A lever is in juxtaposition to the acme nut and friction wheel. The lever is angularly displaced by the acme screw interacting with the acme nut to frictionally interact with the friction wheel when the park brake motor is activated. This provides a park brake feature and prevents movement of the shaft.

6 Claims, 1 Drawing Sheet

ELECTRIC PARK BRAKE ACTUATOR (ELECTRIC CALIPER)

BACKGROUND OF THE INVENTION

The present invention generally relates to brakes for motor vehicles and, more particularly, to an electric park brake for use in an electric caliper brake system.

A brake system for a motor vehicle functionally reduces the speed of the vehicle or maintains the vehicle in a rest position. Various types of brake systems are used in automotive vehicles, including hydraulic, anti-lock (ABS), and electric, also referred to as "brake by wire". An electric brake system accomplishes the above functions of reducing speed and maintaining the vehicle in a rest position through the use of an electric caliper. Generally, the electric caliper includes a motor and a gear system to transfer the load or force that is necessary to stop or maintain the vehicle in a rest position.

Therefore, there is a need in the art for an electric park brake for use in an electric caliper brake system to maintain the vehicle in a rest position. There is a limited amount of space available for use by an electric caliper, which is limited by the available space within a wheel. Thus, there is a need in the art to provide an electric park brake for use in an electric caliper brake system that is spatially efficient.

SUMMARY OF THE INVENTION

There is provided, an electric park brake for use in an electric caliper brake system that satisfies those needs outlined above and provides an electric park brake that is spatially efficient. The electric park brake of the present invention includes an electric caliper motor assembly. The electric caliper motor assembly includes a motor, which is operably coupled to a shaft. The motor and shaft are surrounded by a housing. A friction wheel is disposed axially and operably connected to the shaft within the housing. A park brake motor is disposed within a second housing. The second housing is connected to the first housing and positioned laterally in relation to the shaft. An acme screw is operably coupled to the park brake motor wherein the acme screw interacts with an acme nut. A lever is in juxtaposition to the acme nut and friction wheel. The lever is angularly displaced by the acme screw interacting with the acme nut to frictionally interact with the friction wheel when the park brake motor is activated. This provides a park brake feature and prevents movement of the shaft.

BRIEF DESCRIPTION OF THE DRAWINGS

The various advantages of the present invention will become apparent to one skilled in the art by reading the following specification and claims, by referencing the following drawings in which:

DESCRIPTION OF THE PREFERRED EMBODIMENT

Figure 1:
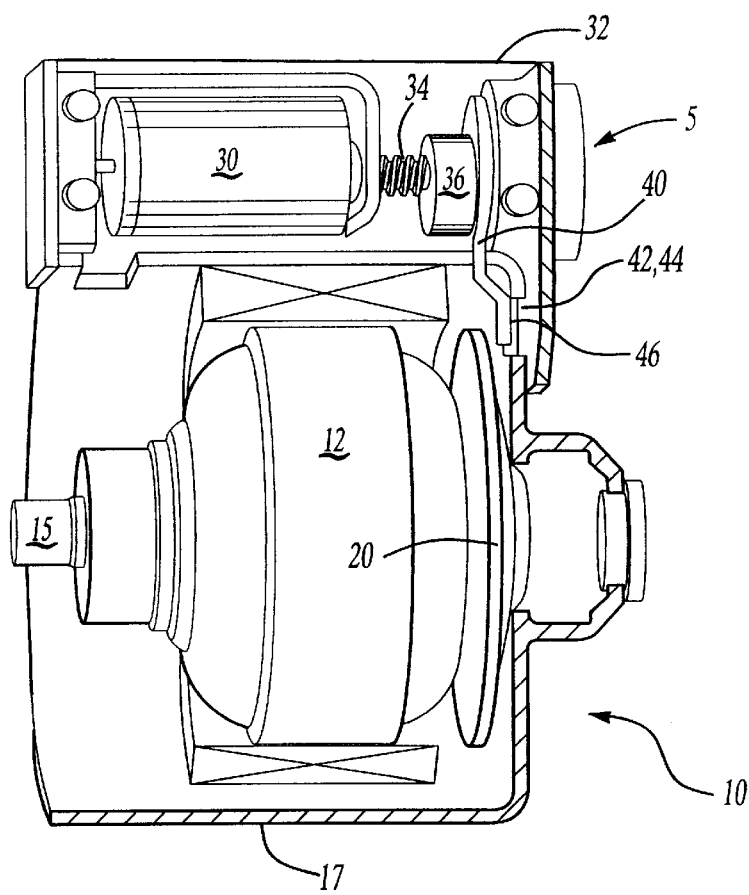
FIG. 1 is perspective view of the electric park brake and electric caliper brake system.

With reference to FIG. 1, there is shown the electric park brake 5 of the present invention. The electric park brake 5 includes an electric caliper motor assembly 10, a friction wheel 20, a park brake motor 30, and a lever 40. The electric caliper motor assembly 10 includes an electric caliper motor 12 that is operably coupled to a shaft 15. The motor 12 provides the necessary mechanical force to operate the electric caliper. The motor 12 and shaft 15 are surrounded by a first housing 17.

The friction wheel 20 is disposed axially on and operably connected to the shaft 15. The friction wheel 20 is operably coupled to the shaft 15 within the first housing 17.

Again with reference to FIG. 1, the electric park brake 5 includes a park brake motor 30 disposed within a second housing 32. The second housing 32 is connected to the first housing 17 such that it is positioned laterally in relation to the shaft 15. An acme screw 34 is operably coupled to the park brake motor 30. The acme screw 34 interacts with an acme nut 36.

There is also included in the electric park brake 5 of the present invention, a lever 40 in juxtaposition to the acme nut 36 and friction wheel 20. The lever 40 is displaced by the acme screw 34 interacting with the acme nut 36 such that the lever frictionally interacts with the friction wheel 20 when the park brake motor 30 is activated. The spring 52 applies a constant load to the motor 30 to allow the interaction force.

With reference to FIG. 1, it can be seen that the first housing 17 and second housing 32 have a slot 42, 44 formed therein to allow the lever to interact between the friction wheel 20 and the acme nut 36. The lever 40 has a friction surface 46 formed on an end of the lever that is to interact with the friction wheel 20.

Figure 2:
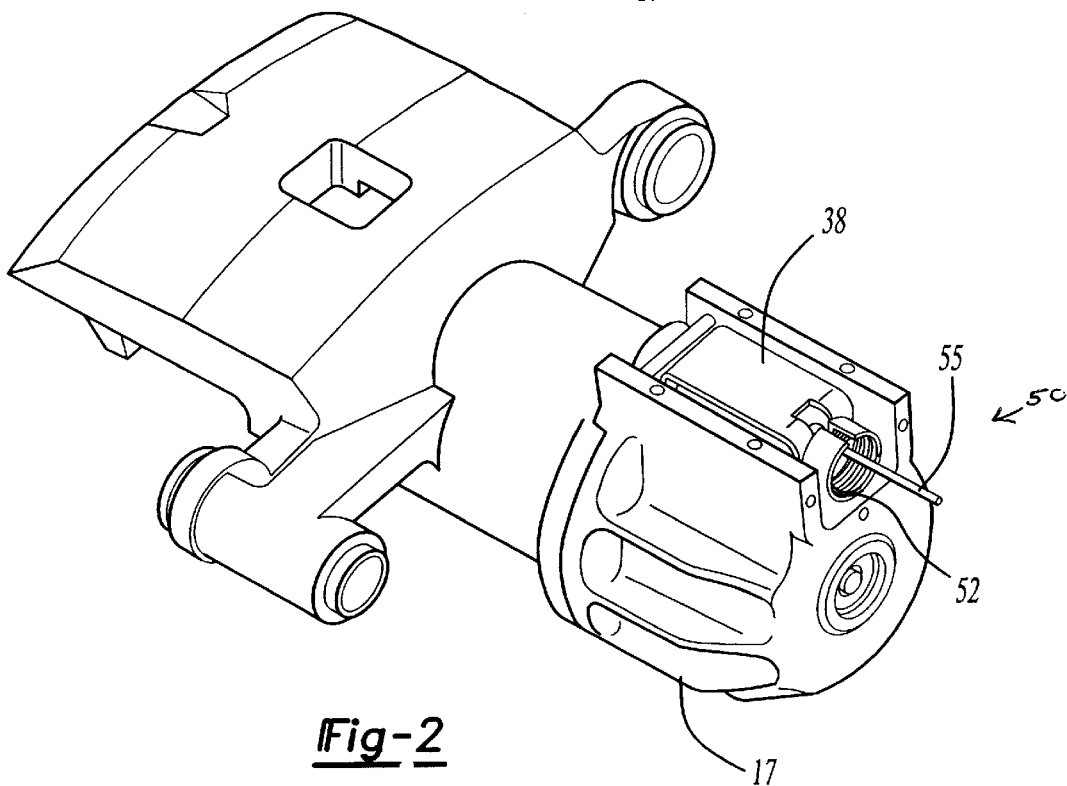
FIG. 2 is a perspective view of the electric park brake and electric caliper brake system detailing the manual release mechanism.

The electric park brake 5 of the present invention also includes a manual release mechanism 50. The manual release mechanism 50 is to be used to release the park brake should an electrical problem occur that would not allow the park brake motor 30 to be activated electrically. With reference to FIG. 2, the manual release mechanism 50 includes a spring 52 that is disposed against the housing 32 of the park brake motor 30. Also included, is a bracket 38 that is disposed within the second housing 32 and around the park brake motor 30 and acme screw 34. The spring interacts with the acme nut 36 and the housing 32 to maintain the acme screw 36 and motor 30 in a fixed position. The manual release mechanism 50 also includes a cable 55 that is coupled to the bracket 38. When a sufficient force is applied to the cable 55, the spring 52 is compressed, by the bracket 38. When the spring 52 is compressed, the lever 40 is angularly displaced away from the friction wheel 20. The potential energy within the friction wheel 20 is released to disengage brake clamp loading. As a result, the lever 40 is angularly displaced away from the friction wheel 20. This allows the shaft 15 to again freely rotate.

While preferred embodiments are disclosed, a worker in this art would understand that various modifications would come within the scope of the invention. Thus, the following claims should be studied to determine the true scope and content of this invention.

What is claimed is:

1. An electric park brake for use in an electric caliper brake system comprising:
   a. an electric caliper motor assembly, said electric caliper motor assembly including a motor operably coupled to a shaft, said motor and shaft surrounded by a first housing;
   b. a friction wheel disposed axially on and operably connected to said shaft within said housing;
   c. a park brake motor disposed within a second housing, said second housing connected to said first housing;
   d. an acme screw operably coupled to said park brake motor, said acme screw interacting with an acme nut;

e. a lever in juxtaposition to said acme nut and said friction wheel, said lever being angularly displaced by said acme screw interacting with said acme nut to frictionally interact with the friction wheel when said park brake motor is activated for providing a park brake feature and preventing movement of said shaft.

2. The electric park brake of claim 1, wherein said first housing and second housing include a slot formed therein to allow said lever to interact with said friction wheel and said acme nut.

3. The electric park brake of claim 2, wherein said lever has a friction surface positioned on an end of said lever that is in juxtaposition with said friction wheel.

4. The electric park brake of claim 1, wherein said second housing is disposed on said first housing and positioned laterally in relation to said shaft.

5. The electric park brake of claim 1, further including a manual release mechanism for displacing said lever away from said friction wheel after said park brake motor has been engaged without the use of power.

6. The electric park brake of claim 5, wherein said manual release, mechanism comprises a cable attached to a bracket disposed within said second housing and around said park brake motor and acme screw, said bracket interacting with a spring disposed between said second housing and an end of said acme screw that is interacting with said acme nut, said spring being compressed when sufficient force is applied to said cable, allowing said acme screw to back drive and angularly displace said lever away from said friction wheel.

* * * * *